(12) United States Patent
Sahin (10) Patent No.: US 12,208,888 B2
(45) Date of Patent: Jan. 28, 2025

(54) ROTARY WING AIR VEHICLE

(71) Applicant: TUSAS—TURK HAVACILIK VE UZAY SANAYII ANONIM SIRKETI, Ankara (TR)

(72) Inventor: Burhan Sahin, Ankara (TR)

(73) Assignee: TUSAS—TURK HAVACILIK VE UZAY SANAYII ANONIM SIRKETI, Ankara (TR)

( * ) Notice: Subject to any disclaimer, the term of this patent is extended or adjusted under 35 U.S.C. 154(b) by 0 days.

(21) Appl. No.: 18/269,179

(22) PCT Filed: May 25, 2021

(86) PCT No.: PCT/TR2021/050484
§ 371 (c)(1),
(2) Date: Jun. 22, 2023

(87) PCT Pub. No.: WO2022/146286
PCT Pub. Date: Jul. 7, 2022

(65) Prior Publication Data
US 2024/0059408 A1   Feb. 22, 2024

(51) Int. Cl.
*B64C 27/50* (2006.01)
*B64C 11/00* (2006.01)
(Continued)

(52) U.S. Cl.
CPC ............ *B64C 27/50* (2013.01); *B64C 11/008* (2013.01); *B64C 11/28* (2013.01); *B64C 27/001* (2013.01)

(58) Field of Classification Search
CPC ........... B64C 11/28; B64C 27/50; B64C 3/56; B64C 27/473; B64C 11/20; B64U 30/293
See application file for complete search history.

(56) References Cited

U.S. PATENT DOCUMENTS 3,773,433 A    11/1973  Hollrock
10,814,959 B2 * 10/2020  Cheung ................. B64D 27/24
(Continued)

FOREIGN PATENT DOCUMENTS

| CN | 104816825 A | 8/2015 |
| GB | 645271 A | 10/1950 |
| GB | 1332658 A | 10/1973 |

OTHER PUBLICATIONS

International Search Report and Written Opinion for PCT application No. PCT/TR2021/050484, mailed Feb. 16, 2022.
(Continued)

*Primary Examiner* — Timothy D Collins
*Assistant Examiner* — Terri L Filosi
(74) *Attorney, Agent, or Firm* — Notaro, Michalos & Zaccaria P.C.

(57) ABSTRACT

A rotary wing aircraft has a body (2), a rotor (3) positioned so as to extend outward from within the body (2) and to rotate about its axis, at least one blade (4) extending outward from the rotor (2) and providing lift and/or thrust force to the body (2) by its movement, at least one outer blade (401) positioned in the blade (4) and providing lift and/or thrust force to the body (2), and at least one mechanism (5) enabling the outer blade (401) to switch from a retracted first position in which the it is almost entirely located in the blade (4) to a second position in which it extends outward from the blade (4) by moving linearly under the influence of the centrifugal force generated during the movement of the rotor (2).

12 Claims, 6 Drawing Sheets

(51) Int. Cl.
    *B64C 11/28*         (2006.01)
    *B64C 27/00*         (2006.01)

(56)                   References Cited

U.S. PATENT DOCUMENTS

| | | |
|---|---|---|
| 2002/0109042 A1 | 8/2002 | Byrnes et al. |
| 2003/0230898 A1* | 12/2003 | Jamieson .............. F03D 7/0236 |
| | | 290/55 |
| 2012/0219417 A1* | 8/2012 | Podgurski ............. B64C 27/467 |
| | | 416/143 |
| 2018/0072410 A1 | 3/2018 | Johnson |

OTHER PUBLICATIONS International Preliminary Report on Patentability, completed Mar. 30, 2023.
Demand/Request for Preliminary Examination dated Oct. 24, 2022.
Written Opinion of the International Preliminary Examining Authority dated Jan. 26, 2023.
Response to Office Action dated Feb. 15, 2023.
Written Opinion of the International Preliminary Examining Authority dated Nov. 18, 2022.
Response to Office Action dated Jan. 13, 2023.
International Application Status Report generated Jun. 5, 2023.

* cited by examiner

ROTARY WING AIR VEHICLE

FIELD

This invention relates to folding systems of blades used in rotary wing air vehicles such as helicopters.

BACKGROUND

Rotary wing air vehicles can perform their flight operations by creating an effect on flow by means of structures known as rotors and having blades thereon. The larger size of blades means that they will have a higher thrust in terms of the air vehicle. However, the storage, parking and transportation of helicopters pose a problem since the blades occupy a large volume. In this regard, systems have been developed for blade folding, but they are not automated. Currently, the blades are folded by being brought to a single direction by removing the screws at the points where the blade roots are connected to the rotor. This situation is operationally very laborious in the field and leads to time loss. In this regard, folding the blades by field personnel for storing a helicopter can be strategically disadvantageous in terms of operation and the safety of persons.

The United States patent document U.S. Pat. No. 3,773,433A, which is included in the known state of the art, describes a blade coupled to a rotor, being able to lengthen and shorten under the effect of centrifugal force. It comprises a stopper element interacting with the blades. Thus, the movement of blades resulting from the centrifugal force is restricted in undesirable circumstance. In addition, according to said patent document, an elastic element is provided in at least one of blade segments, enabling the blade segments to perform a telescopic motion by the centrifugal force.

SUMMARY

With the rotary wing air vehicle developed by this invention, an effective and reliable solution is provided to the volume-occupation problem of blades when rotary wing air vehicles such as helicopters are not in operation.

Another object of this invention is to provide a practical and economical solution for folding the blades.

A further object of this invention is to aerodynamically improve the folding of blades.

The rotary wing air vehicle realized to achieve the object of the invention, as defined in the first claim and in the claims dependent thereon, comprises a body, a rotor within the body, rotated at a user-determined speed, at least one blade positioned so as to be connected to the rotor, enabling the rotary wing air vehicle to perform flight operations with the thrust and lifting force generated by itself as a result of being rotated by means of the rotor being moved, at least one outer blade provided in the blade, positioned in a closed first position within the blade when the rotary wing air vehicle is not actively operating and brought to a second position by moving outward from within the blade and opening under the effect of centrifugal force generated on the blade by the movement of the rotor and therefore the blade, and a mechanism, enabling the outer blade to move, providing the mechanical transmission between the outer blade and the blade, and enabling an automated switching to take place from the first position to the second position and/or from the second position to the first position.

Due to the geometric form incompatibility caused by the telescopic movement occurring between the outer blade and the blade, the rotary wing air vehicle of the invention comprises a transition apparatus, which provides a transition with an aerodynamic transitional surface smoothness between the blade and the outer blade as a result of having a form that surrounds both the outer blade and the blade, and functions as a stopper for the movement of the outer blade within the blade.

In an embodiment of the invention, the rotary wing air vehicle comprises a transition apparatus with one end having a profile cross-section that is well-matched to the blade and another end having a profile cross-section that is well-matched to the outer blade.

In an embodiment of the invention, the rotary wing air vehicle has at least a partially interference fit connection between the transition apparatus and the outer blade when the moving outer blade is in the second position. Thus, it comprises a transition apparatus that enables an efficient structural performance.

In an embodiment of the invention, the rotary wing air vehicle comprises a transition apparatus that is coupled to the blade by means of a interference fit connection. Thus, it is contributed to the structural performance.

In an embodiment of the invention, the rotary wing air vehicle comprises a transition apparatus with a form that becomes thinner and narrower from the section where the transition apparatus wraps the blade up to the section where it wraps the outer blade.

In an embodiment of the invention, the rotary wing air vehicle comprises a transition apparatus having at least one dampening surface therein, thereby minimizing the vibration resulting from the movement of the outer blade when switching from the first position to the second position.

In an embodiment of the invention, the rotary wing air vehicle comprises a transition apparatus having a protrusion in itself, functioning as a stopper and preventing the outer blade from coming fully out of the blade when the outer blade is in the second position.

In an embodiment of the invention, the rotary wing air vehicle comprises a transition apparatus having a double curvature form, enabling a high aerodynamic performance to be achieved during the flight of the rotary wing air vehicle.

In an embodiment of the invention, the rotary wing air vehicle comprises a transition apparatus, which has a more rigid material such as metal that is different from the material of the blade and outer blade and enables the vibration to be minimized.

In an embodiment of the invention, the rotary wing air vehicle comprises at least one slide allowing the outer blade to move from the first position to the second position and/or from the second position to the first position, at least one rope connected to the outer blade, at least one winding bearing on which the rope is wound, a shaft allowing the winding bearing to rotate around its axis, and a mechanism having at least one elastic element to which the shaft is connected, providing resistance against the centrifugal force generated by the movement of the blade and the outer blade. In this way, the centrifugal force generated by the rotation of the rotor and blade exceeds the potential force of the elastic element, allowing the rope to rotate over the winding bearing, thereby enabling the outer blade to move from the first position to the second position. When the rotation of the the rotor and blades stop, the elastic element exceeds the decreasing centrifugal force, enabling the rope to be wound over the winding bearing in the opposite direction toward the elastic element, thereby allowing the outer blade to come from the second position to the first position in the blade.

In an embodiment of the invention, the rotary wing air vehicle comprises a mechanism having an elastic element in the type of a helical spring.

In an embodiment of the invention, the rotary wing air vehicle comprises a transition apparatus with a length of ⅙th of the length of the outer blade and a blade having a length of 1.80 to 1.85 times the length of the outer blade. In this way, the telescopic movement between the blade and the outer blade, and the aerodynamic performance-protective effect of the transition apparatus on the outer blade and the blade are ensured at an optimum level.

BRIEF DESCRIPTION OF THE DRAWINGS

In an embodiment of the invention, the rotary wing air vehicle comprises a polymeric transition apparatus made of a resin-impregnated fabric.

The rotary wing air vehicle realized to achieve the object of the invention is shown in the attached figures, wherein from these figures.

DETAILED DESCRIPTION

Figure 1:
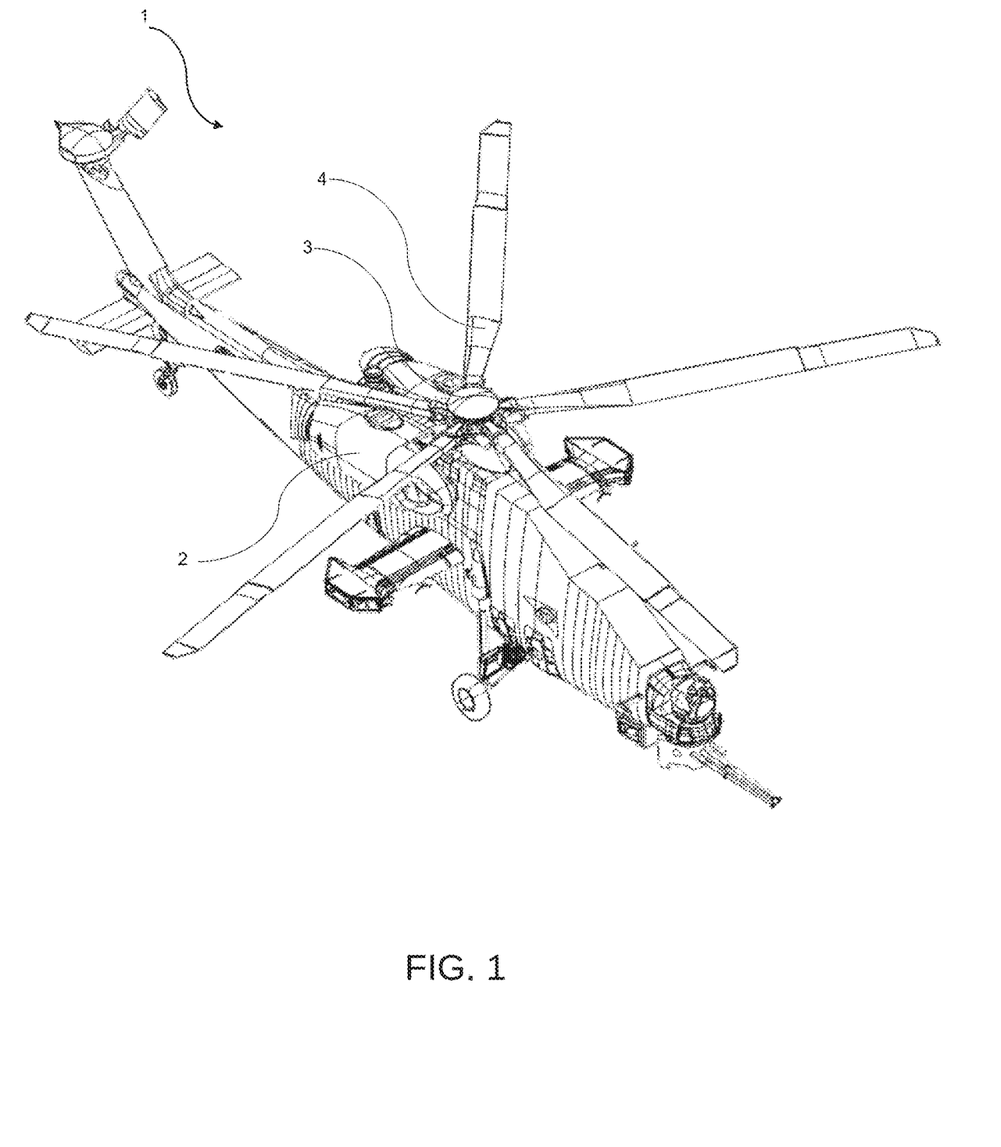
FIG. 1 is a perspective view of the rotary wing air vehicle.
Figure 2:
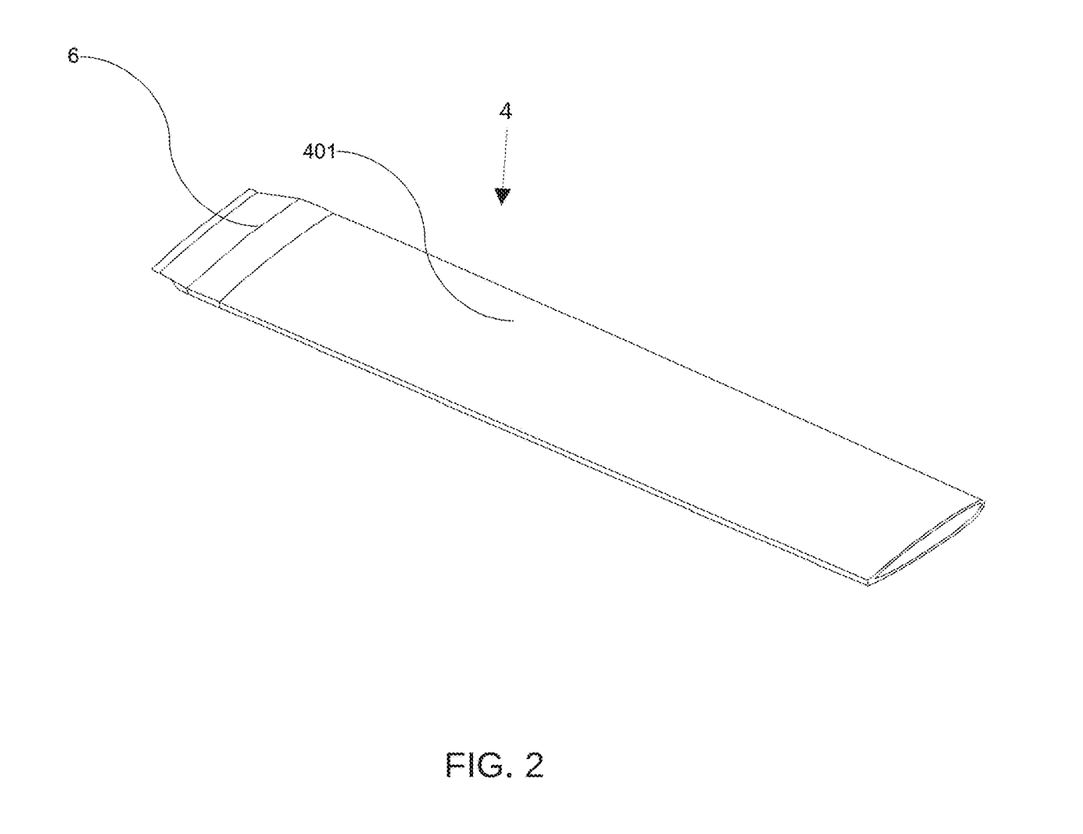
FIG. 2 is a perspective view of the blade in the first position.
Figure 3:
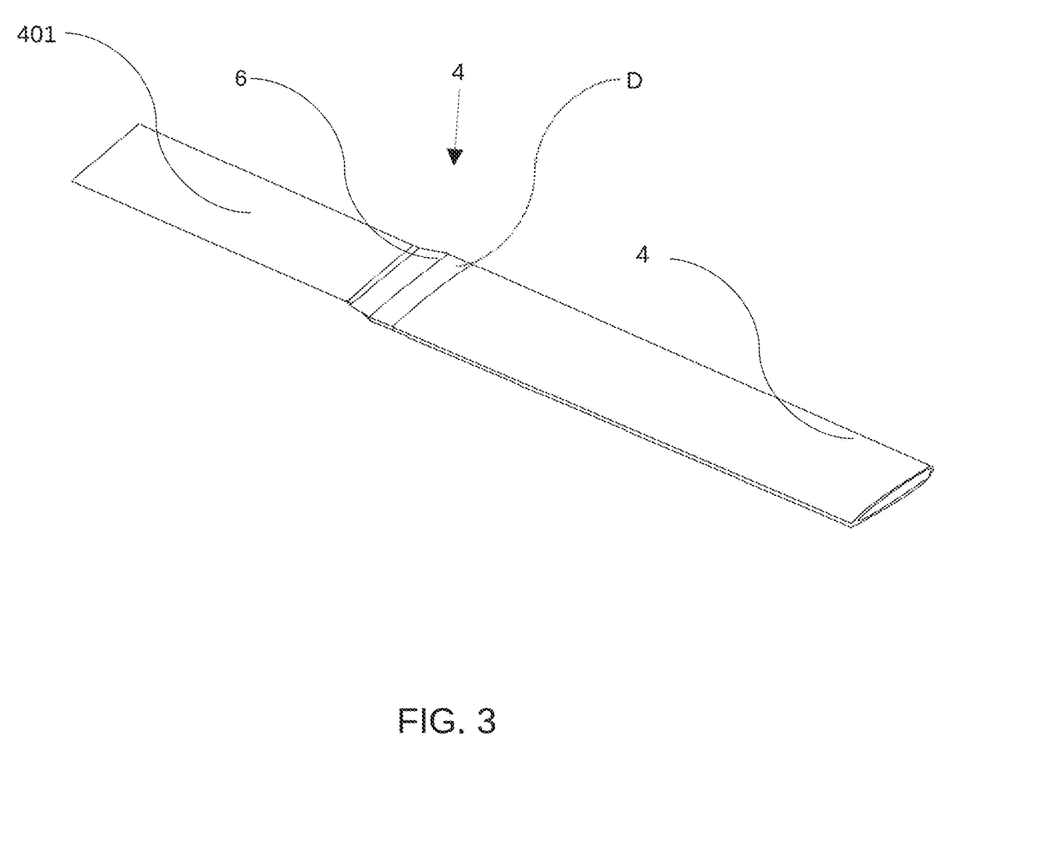
FIG. 3 is a perspective view of the blade in the second position.

The parts illustrated in figures are individually assigned a reference numeral and the corresponding terms of these numbers are listed below.
1. Rotary wing air vehicle
2. Body
3. Rotor
4. Blade
401. Outer blade
5. Mechanism
501. Slide
502. Rope
503. Winding bearing
504. Shaft
505. Elastic element
6. Transition apparatus
7. Protrusion The rotary wing air vehicle (1) comprises a body (2), a rotor (3) rotating about its axis and positioned so as to extend outward from within the body (2), at least one blade (4) extending outward from the rotor (2) and providing lift and/or thrust to the body (2) by its movement, at least one outer blade (401) positioned in the blade (4) and providing lift and/or thrust to the body (2), at least one mechanism (5) enabling the outer blade (401) to switch from a retracted first position in which the it is almost entirely located in the blade (4) to a second position in which it extends outward from the blade (4) by moving linearly under the influence of the centrifugal force generated during the movement of the rotor (2). (FIG. 1, FIG. 2, FIG. 3)

The rotary wing air vehicle (1) of the invention comprises a transition apparatus (6) on the blade (4), at least a part of which circumferentially grips the blade (4) and at least a part of which is form-fitting with the circumference of the outer blade (401), thereby preventing the outer blade (401) from completely coming out of the blade (4). (FIG. 2, FIG. 3)

The blade (4) of the rotary wing air vehicle (1) can be rotated by means of the rotor (3) extending outward from within the body (2). Therefore, the blade (4) provides sufficient lift and thrust to the rotary wing air vehicle (1) and performs the flight action. The blade (4) comprises an outer blade (401), which moves to a second position ready for flight so that the blade comes out of a retracted first position by the centrifugal force generated by the rotation of the blade (4) around the rotor (3). By means of a mechanism (5), the outer blade (401) may telescopically go in and out of the blade (4) according to the centrifugal force. Thus, the outer blade (401) does not occupy space when the rotary wing air vehicle (1) is not in operation. An effective and efficient system for adjusting the length of the outer blade (401) is provided. (FIG. 2, FIG. 3)

The telescopic moving capability between the blade (4) and the outer blade (401) can be achieved by the dimensional difference between the outer blade (401) and the blade (4). A transition apparatus (6) is provided on the blade (4), effectively reducing the resulting aerodynamic disadvantages such as air drag and at the same time limiting the maximum distance that the outer blade (401) will come out of the blade (4). The transition apparatus (6) provides a safe telescopic system while effectively ensuring the flow performance of the telescopic blade (4). The transition apparatus (6) acts as a complement to the aerodynamic surface between the blade (4) and the outer blade (401), thus providing an effective, safe and efficient use for the telescopic system. (FIG. 2, FIG. 3)

In an embodiment of the invention, the rotary wing air vehicle (1) comprises a transition apparatus (6) having one end with a profile cross-section that is almost the same as that of the blade (4) and another end with a profile cross-section that is almost the same as that of the outer blade (401). Thus, an efficient aerodynamic surface profile is provided for the rotary wing air vehicle (1). (FIG. 2, FIG. 3)

In an embodiment of the invention, the rotary wing air vehicle (1) comprises a transition apparatus (6) having at least a partially interference fit connection structure (F) between itself (6) and the outer blade (401) when the outer blade (401) is in the second position, thereby providing an effective structural performance.

In an embodiment of the invention, the rotary wing air vehicle (1) comprises a transition apparatus (6) that is connected to the blade (4) by means of an interference fit coupling, thereby contributing to the structural performance.

Figure 4:
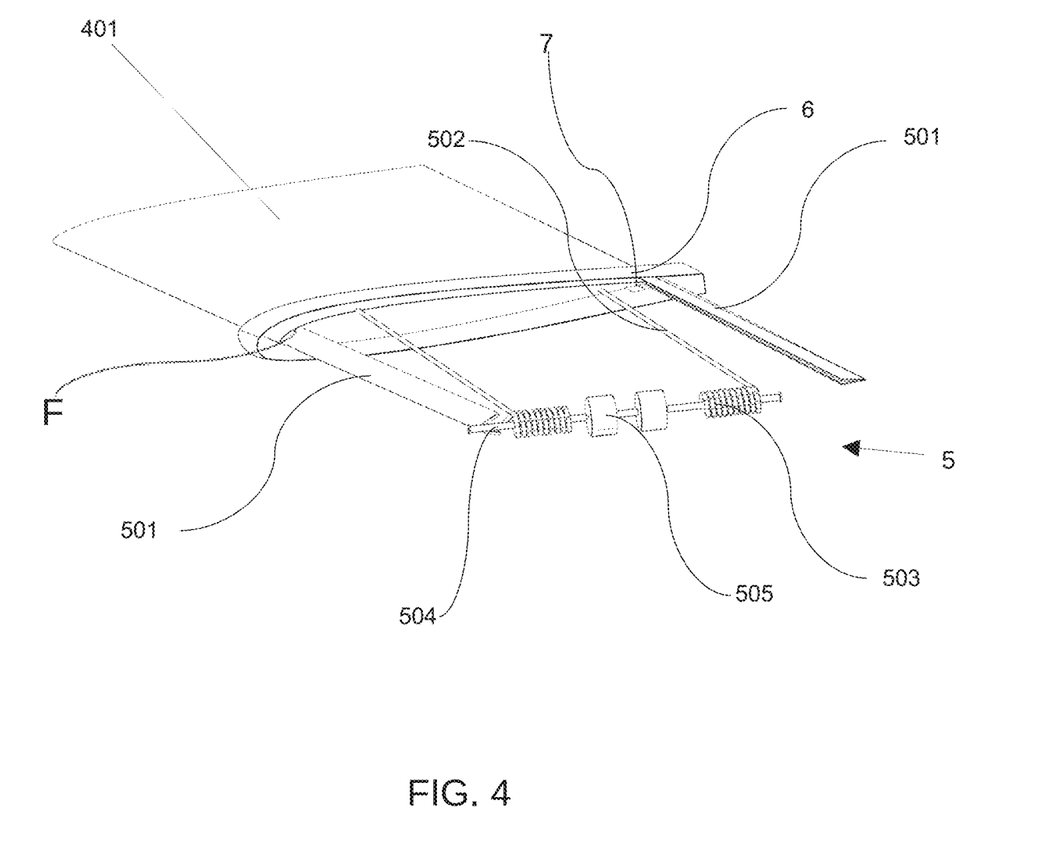
FIG. 4 is a perspective view of the mechanism and the outer blade in the second position.

In an embodiment of the invention, the rotary wing air vehicle (1) comprises a transition apparatus (6) having at least one dampening surface (D) therein, thereby dampening the vibration resulting from the movement of the outer blade (401) when switching from the first position to the second position. (FIG. 3, FIG. 4)

In an embodiment of the invention, the rotary wing air vehicle (1) comprises a transition apparatus (6) having a protrusion (7) therein, preventing the outer blade (401) in the second position from coming out of the blade (4). (FIG. 4)

In an embodiment of the invention, the rotary wing air vehicle (1) comprises a transition apparatus (6) having a double curvature form, thereby contributing to the aerodynamic surface performance.

In an embodiment of the invention, the rotary wing air vehicle (1) comprises a transition apparatus (6) having a more rigid material that is different from the material of the blade (4) and outer blade (401), thereby allowing the vibration to be reduced.

Figure 5:
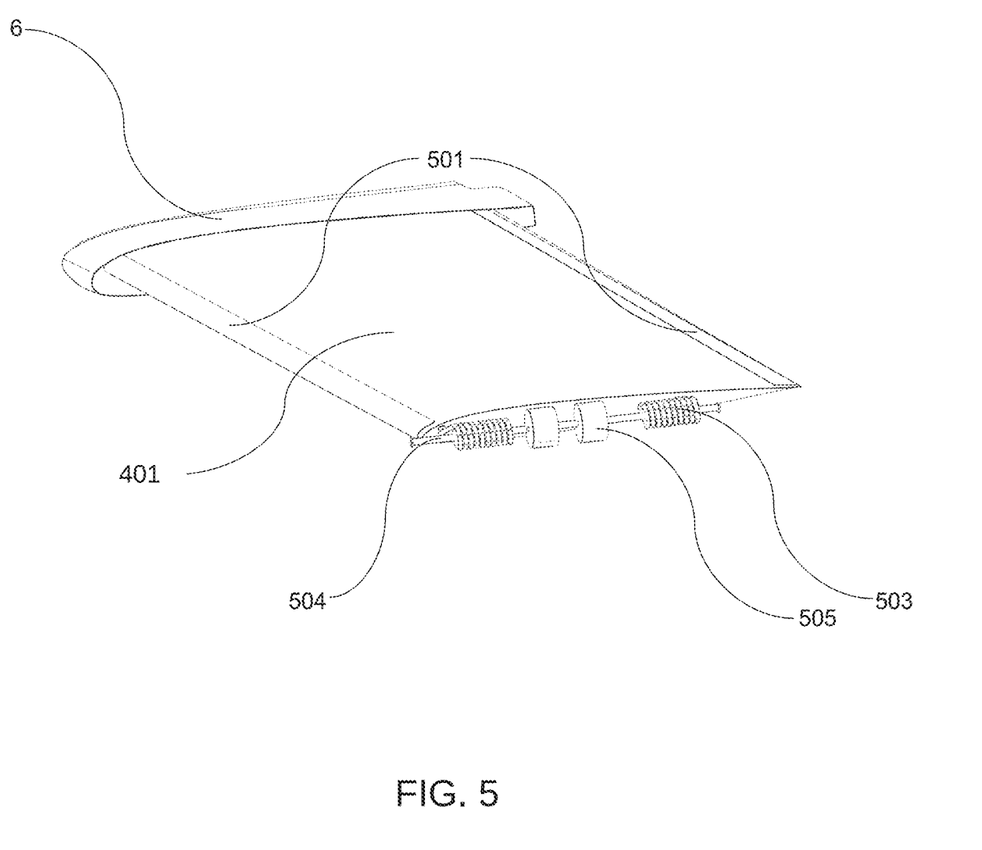
FIG. 5 is a perspective view of the mechanism and the outer blade in the first position.
Figure 6:
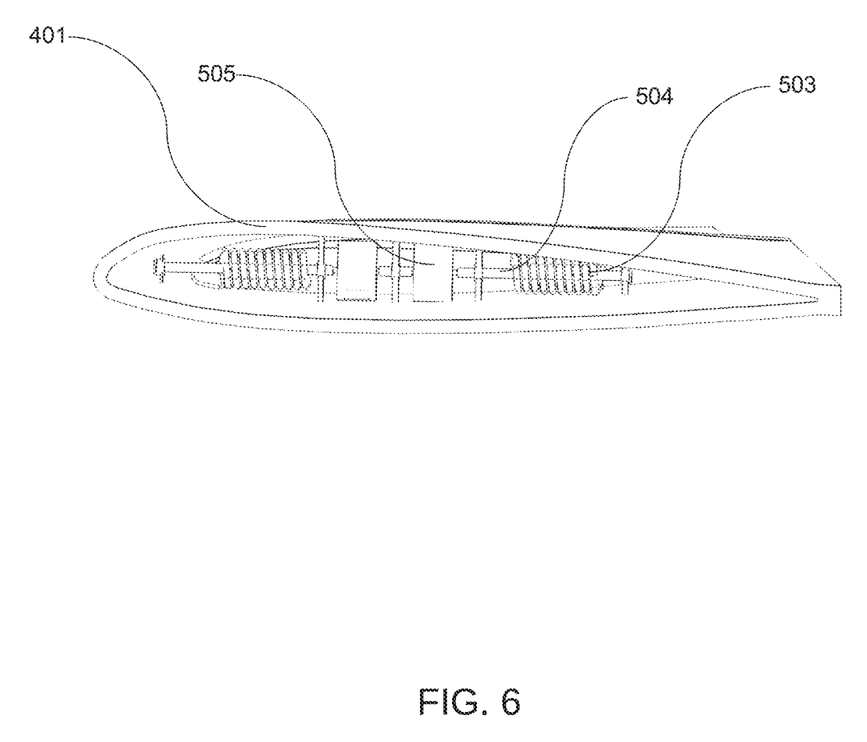
FIG. 6 is a perspective view of the mechanism in the inner blade.

In an embodiment of the invention, the rotary wing air vehicle (1) comprises at least one slide (501) allowing the outer blade (401) to move by sliding from the first position to the second position and/or from the second position to the first position, at least one rope (502) connected to the outer blade (401), at least one winding bearing (503) on which the rope (502) is wound, a shaft (504) allowing the winding bearing (503) to rotate around its axis, and a mechanism (5) with at least one elastic element (505) to which the shaft (504) is connected, providing resistance against the centrifugal force generated by the movement of the blade (4) and the outer blade (401). (FIG. 5) In an embodiment of the invention, the rotary wing air vehicle (1) comprises a mechanism (5) having a helical spring-type elastic element (505).

In an embodiment of the invention, the rotary wing air vehicle (1) comprises a transition apparatus (6) with a length of ⅙th of the length of the outer blade (401) and a blade (4) having a length that is 1.80 to 1.85 times the length of the outer blade (401). This ensures a safe and efficient fit between the blade (4), outer blade (401) and transition apparatus (6).

In an embodiment of the invention, the rotary wing air vehicle (1) comprises a polymeric transition apparatus (6) manufactured from a resin-impregnated fabric.

The invention claimed is:

1. A rotary wing air vehicle (1) comprising:
    a body (2);
    a rotor (3) having an axis, the rotor (3) rotating about axis thereof and coupled to the body (2);
    at least one blade (4) extending outward from the rotor (3) and providing lift and/or thrust force to the body (2) by movement of the blade (4);
    at least one outer blade (401) positioned in the blade (4) and providing lift and/or thrust force to the body (2);
    a mechanism (5) enabling the outer blade (401) to switch from a retracted first position in which the outer blade is located in the blade (4) to a second position in which it extends outward from the blade (4) by moving linearly under the influence of the centrifugal force generated during the movement of the rotor (3); and
    a transition apparatus (6) which is provided on the blade (4), at least a part of which circumferentially grips the blade (4) and at least a part of which is form-fitting with the circumference of the outer blade (401), which has one end with a profile cross-section that is the same as that of the blade (4) and which has another end with a profile cross-section that is the same as that of the outer blade (401), which is configured to prevent the outer blade (401) from completely coming out of the blade (4), and which provides a transition with an aerodynamic transitional surface smoothness between the blade (4) and the outer blade (401) as a result of having a form that surrounds both the outer blade and the blade, and functions as a stopper for the movement of the outer blade within the blade.

2. The rotary wing air vehicle (1) as claimed in claim 1, wherein the transition apparatus (6) has at least a partially interference fit connection structure (F) with the outer blade (401) when the outer blade (401) is in the second position, thereby providing an efficient structural performance.

3. The rotary wing air vehicle (1) as claimed in claim 1, wherein the transition apparatus (6) is connected to the blade (4) in an interference fit form, thereby contributing to the structural performance.

4. The rotary wing air vehicle (1) as claimed in claim 1, wherein the transition apparatus (6) has a form that becomes thinner and narrower from a part thereof surrounding the blade (4) to a part thereof surrounding the outer blade (401).

5. The rotary wing air vehicle (1) as claimed in claim 1, wherein the transition apparatus (6) has at least one dampening surface therein, thereby dampening the vibration resulting from the movement of the outer blade (401) while it switches from the first position to the second position.

6. The rotary wing air vehicle (1) as claimed in claim 1, wherein the transition apparatus (6) has a protrusion (7) therein, preventing the outer blade (401) from going out of the blade (4) in the second position.

7. A rotary wing air vehicle (1) as claimed in claim 1, wherein the transition apparatus (6) has a double curvature form, thereby contributing to the aerodynamic surface performance.

8. The rotary wing air vehicle (1) as claimed in claim 1, wherein the transition apparatus (6) has a more rigid material that is different from the material of the blade (4) and outer blade (401), thereby enabling the vibration to be reduced.

9. The rotary wing air vehicle (1) as claimed in claim 1, comprising:
    at least one slide (501) allowing the outer blade (401) to move by sliding from the first position to the second position and/or from the second position to the first position,
    at least one rope (502) connected to the outer blade (401),
    at least one winding bearing (503) on which the rope (502) is wound, and
    a shaft (504) having an axis, the shaft (504) allowing the winding bearing (503) to rotate around the axis of the shaft (504), and
    wherein the mechanism (5) has at least one elastic element (505) to which the shaft (504) is connected for providing resistance against the centrifugal force generated by the movement of the blade (4) and the outer blade (401).

10. The rotary wing air vehicle (1) as claimed in claim 9, wherein the elastic element (505) of the mechanism (5) is of a helical spring type.

11. The rotary wing air vehicle (1) as claimed in claim 1, wherein the transition apparatus (6) has a length of ⅙th of the length of outer blade (401) and the blade (4) has a length that is 1.80 to 1.85 times the length of the outer blade (401).

12. The rotary wing air vehicle (1) as claimed in claim 1, wherein the transition apparatus (6) is polymeric and manufactured from a resin-impregnated fabric.

* * * * *